United States Patent [19]

Springer et al.

[11] 3,864,230

[45] Feb. 4, 1975

[54] PRETREATING AND ELECTROCOATING METAL PRODUCTS

[75] Inventors: Willard J. Springer, Livermore; Bruce A. Baker, Jr., Pleasanton, both of Calif.

[73] Assignee: Kaiser Aluminum & Chemical Corporation, Oakland, Calif.

[22] Filed: Jan. 9, 1974

[21] Appl. No.: 431,853

[52] U.S. Cl. .............................................. 204/181
[51] Int. Cl. ............................................ C23b 13/00
[58] Field of Search ................................... 204/181

[56] References Cited
UNITED STATES PATENTS
3,620,949 11/1971 Morrison et al. ................... 204/181

*Primary Examiner*—Howard S. Williams
*Attorney, Agent, or Firm*—Paul E. Calrow; Edward J. Lynch

[57] ABSTRACT

This invention generally relates to the electrocoating of metal products and in particular is directed to the treatment of the metal product having a conversion coating thereon with an alkaline solution having a pH greater than 8 and then subsequently electrocoating the metal product.

6 Claims, 1 Drawing Figure

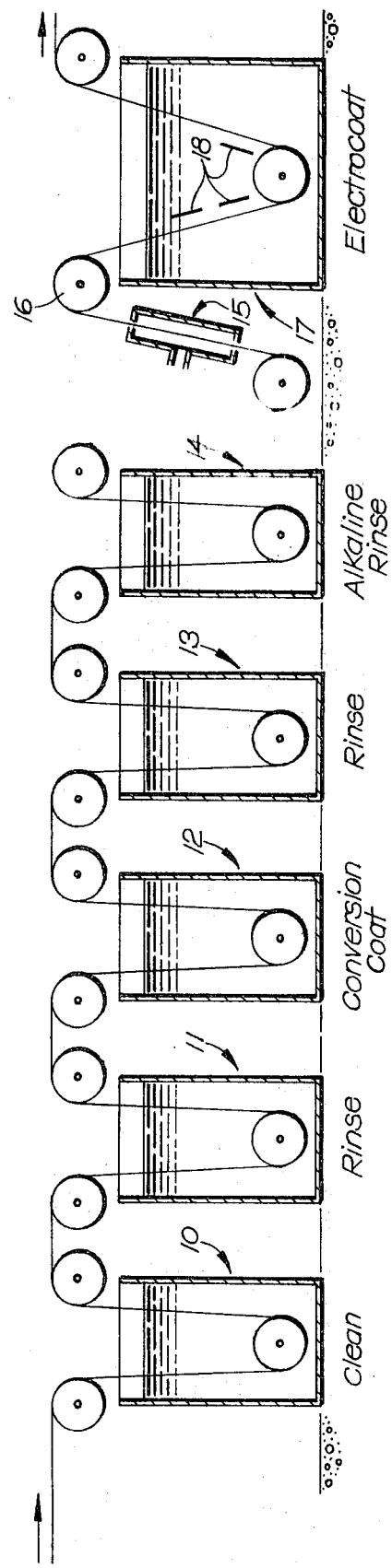

PRETREATING AND ELECTROCOATING METAL PRODUCTS

BACKGROUND OF THE INVENTION

This invention generally relates to an improved method of electrodepositing a water-soluble or water-dispersible coating resin onto a conductive surface, and, in particular, is directed to an alkaline pretreatment to improve both the cured and uncured resin adhesion and the corrosion resistance of the cured product.

The electrodeposition of water-based coatings, commonly termed electrocoating, is a widely used process which has many advantages over other methods of coating, such as spraying, dipping, rolling and the like. The advantages of electrocoating are well known. The process deposits a film of uniform thickness on essentially any conductive surface, even those which have sharp points and edges. The electrocoated film when applied is relatively water-free, and, thus, will not run or drip when taken out of the bath. Because little or no organic solvents are used in the resin system, the process is essentially fumeless and requires no extensive fume collection and incineration equipment. This latter point is important in view of the increased concern over environmental pollution. An additional advantage is the fact that a second or top coat can be applied over the electrocoated film without curing the electrocoated film and then both coats can be cured in one baking operation. By eliminating the necessity of two furnaces, the cost of a two-coat process can be considerably reduced.

The electrocoating process generally comprises immersing the article to be coated into the electrocoating bath, usually as an anode, and passing a current through the bath between the article and electrode. The process usually is self-arresting in that as the thickness of the coating increases, the resistance thereof also increases, thereby limiting the amount of coating which is electrodeposited.

The overall anodic electrocoating process involves four separate processes, namely, electrophoresis, electrocoagulation, electroendosmosis and electrolysis. Electrophoresis involves driving negatively charged resin particles to the positively charged anode which is the article to be coated. In electrocoagulation, the resin particle loses a negative charge in the close vicinity of the anode or in contact therewith which causes the resin particles to lose their stability and coagulate on or about the anode. Electroendosmosis occurs during and after electrocoagulation and involves driving water out of the coagulated resin, thus, in effect, drying out the electrodeposited coating. Electrolysis also occurs causing evolution of hydrogen at the cathode and oxygen at the anode. With aluminum and other reactive metals, anodic oxidation usually occurs at least initially. Most commercial electrocoating systems are anodic in that the article to be coated is the anode in the electrocoating cell as described above. However, in certain situations, cathodic deposition, wherein the article is the cathode and the coating resin carries a positive charge, has been found useful.

The coating resin can be water-soluble in that it disassociates into macro-ions to form a true solution or it can be water-dispersible or water-emulsifiable. Usually all three are present in commercially available resin systems. At any rate, in the anodic electrocoating process, the resin particles are negatively charged and under the application of electrical field are driven toward the anode. Because of the negative charge, the particles tend to repel one another and thereby form a stable dispersed phase or solution. However, upon losing the negative charge at the anode, the resin particles coalesce and deposit as the insoluble acid forming a tenacious film on the conductive surface. It is not presently well known how this discharge occurs because after the initial formation of the resin layer, which is essentially nonconducting, no direct contact with the metal surface for electrical discharge can occur. It is probable that after the initial layer of resin is deposited, charge transfer occurs by ion migration. Specific anodic reactions can and probably do vary from resin system to resin system.

Most commercially available resins for anodic electrocoating generally are polycarboxylic acid-based resins and frequently are acrylic or methacrylic acid-based resins. To solubilize the resins, they are usually completely or nearly completely neutralized by a base, such as an amine or KOH. With cathodic electrocoating, the resin generally is a basic polymer resin which has been neutralized with a soluble acid. During anodic electrocoating, the amine takes on a hydrogen ion and is driven to the cathode where $H_2$ is liberated. The amine or other neutralizing agent is not deposited in the coating and will stay in the bath except for small amounts which are lost through dragout. To maintain a relatively constant level of amine, it is preferred to treat the bath in an ultrafilter or other suitable device to remove amines and other low molecular weight contaminants from the bath. For an excellent discussion on the use of ultrafilters in purifying electrocoating baths, see the article "Ultrafiltration of Electrocoating Systems", in *Nonpolluting Coatings and Coating Processes*, Plenum Press (1973) edited by J. L. Gardon and J. w. prane. Coupling agents which assist in solubilizing the paint resin are frequently added. The resin can be pigmented or clear as desired.

Conventional coating of metal products generally comprises first, thoroughly cleaning and degreasing the metal strip or sheet such as by treatment with a cleaning solution, usually an inhibited aqueous alkaline cleaning solution (or alternately etching in a highly alkaline solution), rinsing with water, and then treating in an acidic chromate and/or phosphate containing solution to form a chemical conversion coating on the metal sheet or strip. After conversion coating, the sheet or strip is rinsed thoroughly, surface dried and then passed to subsequent coating operations. The purpose of a conversion coat is to provide an improved base for the application of the coating resin so as to more firmly adhere the resin to the metal surface. Typical conversion coatings for ferrous products are phosphate-type coatings. Typical conversion coatings for aluminum products include chrome-phosphate-type or ferricyanide accelerated chromic chromate-type coatings. The coating composition for the former is believed to be $Al_2O_3 \cdot 2CrPO_4 \cdot 8H_2O$, whereas, the latter is believed to be $CrFe(CN)_6 \cdot 6Cr(OH)_3 \cdot H_2CrO_4 \cdot 4Al_2O_3 \cdot 8H_2O$. The ferricyanide accelerated conversion coating is probably the most frequently used with the aluminum products, particularly in continuous coil coating processes, because it provides a more corrosion-resistant coating and because the coating weight is much higher than other coatings at equivalent treatment times due to the accelerated coating formation. With chromate containing coatings, frequently the last rinse will be a dilute solution of chromic acid or a mixture of chromic acid and phosphoric acid to improve corrosion resistance. The temperature of the conversion coating bath can be maintained from about room temperature to boiling point of the solution, but generally is maintained between about 80° and 120°F.

Although the electrocoating process offers many advantages over the conventional application of coating resins or paints, frequently, the quality of electrocoated products, such as coating adhesion (both cured and uncured) and corrosion resistance, are considerably less than products which have been coated in a conventional manner. The low quality of electrocoated products is particularly noticeable in the continuous coil coating of sheet or strip wherein the treatment times are very short and where the strip or sheet must be handled frequently.

Against this background, the present invention was developed.

DESCRIPTION OF THE INVENTION

This invention generally relates to the electrocoating of metal products and is particularly directed to the preparation of the surface of the metal product for subsequent electrocoating so as to improve the coating adhesion and the corrosion resistance of the electrocoated product.

In accordance with the present invention, after cleaning of the strip or sheet and the formation thereon of a chemical conversion coating, the strip is treated with an aqueous alkaline solution having a pH of at least 8, preferably from about 9 to 12. Suitable alkaline solutions include aqueous solutions of alkali metal hydroxides, such as lithium hydroxide, potassium hydroxide and sodium hydroxide, and also ammonium hydroxide and the like.

It is presently not clear how this alkaline treatment of the conversion coating provides the improved wet and dry adhesion of the electrocoated film and the improved corrosion resistance of the final coated product. It is believed that the alkaline treatment is dehydrating the surface of the conversion coating. The dehydration of the conversion coating surface apparently prevents the water in the conversion coating from being driven into the electrocoated film by electroendosmosis during electrocoating. This latter point is believed to be a large factor in the low quality of electrocoated products. It is also possible that the alkaline rinse may be accelerating the anodic reactions.

The overall process of the present invention generally will comprise 1. cleaning and degreasing such as treatment in an inhibited alkaline cleaner or etching in a highly alkaline etching solution;
2. rinsing with water;
3. treating in an acidic aqueous solution containing chromates and/or phosphates to form a chemical conversion coating;
4. rinsing with water;
5. treating with an aqueous alkaline solution having a pH of at least 8, preferably 9 to 12;
6. surface drying the metal product; and
7. electrodepositing a resinous film on the metal surface.

After electrocoating, the metal product can be passed to an oven for curing or to other coating facilities for the application of a top coat. The process provides for substantially improved product qualities, such as cured coating adhesion and corrosion resistance, and also improves the wet adhesion of the uncured electrocoated film which minimizes the traffic damage which frequently is characteristic of electrocoating operations. Generally, no rinsing of the metal surface is required after the alkaline treatment. After the alkaline treatment, the strip need only be dried and then passed to the electrocoating operation.

The cleaning solution can be any conventional cleaning solution. Concentrations between about 0.5 and 10 ounces per gallon of water of commercially available cleaners, such as Ridoline 35 and 72, sold by Amchem Corp., and Okite 27, sold by the Oakite Corp., have been found suitable. After cleaning, the metal surfaces are rinsed with water and then passed to the conversion coating treatment facility. Most conventional conversion coatings on aluminum products are either a chromic phosphate type coating or a ferricyanide accelerated chromate coating. The chromic phosphate type of coating is formed by reacting the aluminum surface with an acid solution containing phosphates, hexavalent chromium and a source of fluoride (e.g., Alodine 401-45 sold by Amchem Corp.), whereas the chromate-type coating is formed by treatment with a solution containing hexavalent chromium, a source of fluoride and ferricyanide as an accelerator (e.g., Alodine 1200S). The coatings are quite complex and at least initially are in the form of an acidic gel. Treatment temperatures for the conversion coating bath range from about 80° to 120°F. After the acidic conversion coating treatment, the metal surface should be rinsed well to prevent any carryover of the chromates, phosphates and fluorides and the like into subsequent treatment tanks. After the aforesaid rinsing, the metal surface is given a treatment with an aqueous alkaline solution having a pH greater than 8, preferably about 9 to 12. Suitable alkaline solutions include solutions of sodium hydroxide, potassium hydroxide, ammonium hydroxide and the like. Treatment times need not be extensive. Usually from about 0.5 to 10 seconds is adequate in preparing the surface for electrocoating. Extensive treatment times are not practical on a coil coating line with continuous lengths of metal sheet or strip, but they do not detrimentally affect the quality of the electrocoated product. The temperature can be as low as 60°F, but preferably, the alkaline treatment is at an elevated temperature between about 90° to 180°F to assist in the surface drying of the metal surface after the alkaline treatment. The thus-treated metal product is surface dried and then passed to an electrocoating operation for the application of a polyelectrolyte resin. The electrodeposition can be either anodic or cathodic depending upon the type of resin employed.

Reference is made to the drawing which represents an embodiment of the present invention wherein continuous lengths of sheet or strip are electrocoated. The strip or sheet is first cleaned and degreased (or etched) at 10, rinsed at 11 and then transferred to tank 12 for the formation of the conversion coat. After the conversion coating, the strip is rinsed at station 13 and treated at station 14 with an aqueous alkaline solution with a pH over 8 and then air dried at 15. Following drying, the strip is directed over electrical contact roll 16 into electrocoating tank 17 containing an aqueous dispersion or solution of electrodepositable polyelectrolyte resin. The sheet or strip passes in close proximity to electrodes 18 where most of the electrodeposition occurs and then out of the tank for surface drying and subsequent treatments, such as curing or the application of a top coat and then curing.

The alkaline rinse of the present invention is particularly advantageous in continuous coil coating lines because in addition to an improved coating quality, the alkaline rinse provides an improved adhesion of the uncured resin to the metallic substrate which minimizes the removal of the uncured coating (commonly termed "pick-off") by subsequent strip or sheet handling equipment, such as rollers and the like.

To illustrate the advantages of the present invention, the following examples are given.

EXAMPLE 1

Panels of 3105 aluminum alloy (Aluminum Association designation were cleaned in an inhibited alkaline cleaner, rinsed with water and pretreated in a solution of Alodine 401-45 to produce a conversion coating thereon having a coating weight of approximately 30 milligrams per square foot. After rinsing with water, the panels were treated in an aqueous solution of NaOH having a pH of 10.0. Panels were then air dried and electrocoated (135 volts for 5 seconds) in a 10 percent (by weight) bath of Lectropon, an electrodepositable resin sold by DeSoto, Inc., to provide a uniform film thickness of 0.23 mil. Electrocoated panel was squeegee wiped to remove excess paint, air dried, roll coated with Duracron, an acrylic solvent-based resin sold by PPG, Inc., to a total coating thickness of 1.0 mil and baked at 520°F for 45 seconds. The coated panel had excellent appearance and adhesion between the coating and the aluminum substrate. Subsequent accelerated corrosion tests indicated superior corrosion resistance.

EXAMPLE 2

Panels of 3105 aluminum alloy (Aluminum Association designation) were cleaned in an inhibited alkaline cleaner, rinsed with water and then treated in a solution of Alodine 1200S to produce a conversion coating having a coating weight of about 30 milligrams per square foot. After rinsing with water, the panels were treated in an aqueous alkaline solution of NaOH having a pH of 10.0. The panels were air dried and electrocoated (150 volts for 5 seconds) in a 10 percent (by weight) bath of Lectropon, an electrodepositable resin sold by DeSoto, Inc., to a coating thickness of 0.3 mil. The electrocoated panel was squeegee wiped to remove any excess coating, air dried, roll coated with Duracron 100, an acrylic solvent-based resin sold by PPG, Inc., to a total coating thickness of 1.0 mil and baked at 520°F for 45 seconds. The coated panels exhibited excellent appearance and adhesion between the coating and the metal substrate and when tested in accelerated corrosion tests, indicated superior corrosion resistance.

EXAMPLE 3

In a continuous coil coating line wherein aluminum alloy sheet was first cleaned in an inhibited alkaline cleaner, rinsed, treated in an acidic chromate containing solution to form a conversion coating thereon, electrocoated, roll coated to put on a top coat and then both coatings were cured in a single baking operation, tests were conducted wherein the sheet was treated in an aqueous alkaline solution of NaOH at a pH 10 after the conversion coating and wherein the strip was merely rinsed with deionized water after the conversion coating. Cured samples of the tests were evaluated by determining the minimum bend radius with no cracking and no removal of coating from bend area by cellophane tape (the smaller the radius the stronger the bond between the resin and substrate). The samples which were treated with the alkaline solution after the conversion coating had a minimum bend radius of 0T (the thickness of the sheet), whereas the samples which had been rinsed in deionized water had a minimum bend radius of 1T. During the electrocoating tests, when the sheet was treated with a deionized water rinse after the conversion coating, pick-off was considerable, whereas when treated with an alkaline rinse in accordance with the present invention, pick-off was no problem. The corrosion resistance of the alkaline rinsed material was far superior to the deionized water rinsed material.

EXAMPLE 4

Two steel panels were cleaned and then given a treatment in a solution of Bonderite 40 (Parker Chemical Co.) to form a zinc phosphate coating on the panels. One of the panels was treated in an aqueous alkaline solution of NaOH (pH 10) and the other was treated in an acidic rinse solution at a pH of 5 and then both panels were electrocoated in a 10 percent (by weight) bath of Lectropon to form a primer coat of 0.2 mil, squeegee wiped, air dried and then both were roll coated with Duracron 100 to form a total coating thickness of 1 mil. After curing, the panels were tested for coating adhesion by subjecting both panels to a 100-inch pound impact of a ⅝ inch diameter steel mandrel. The panel which was given an acidic rinse exhibited a 40 percent removal (by No. 6 Scotch brand cellophane tape) of the coating on the convex portion of the panel, whereas the panel given an alkaline rinse exhibited only a 10 percent removal of the coating.

It is obvious that various modifications and improvements can be made to the present invention without departing from the spirit thereof and the scope of the appended claims.

What is claimed is:

1. In the method of electrocoating a metal surface wherein the metal surface is treated so as to form thereon a chemical conversion coating, subsequently the metal surface is immersed as an electrode in an aqueous bath containing an electrodepositable polyelectrolyte resin and an electrical current is passed between said product and an electrode in said bath so as to electrodeposit said resin onto said surface, the improvement comprising treating the metal surface having a chemical conversion coating thereon with an aqueous alkaline solution having a pH greater than 8, and then surface drying said treated surface prior to immersing the surface as an electrode into the resin containing aqueous bath.

2. The method of claim 1 wherein the alkaline solution has a pH between about 9 and 12.

3. The method of claim 1 wherein the alkaline solution is a solution of a compound selected from the group consisting of lithium hydroxide, potassium hydroxide, sodium hydroxide and ammonium hydroxide.

4. The method of claim 1 wherein the alkaline solution is a temperature between about 90° and 180°F.

5. The method of claim 1 wherein the treatment time with said alkaline solution ranges from about 0.5 to 10 seconds.

6. In the method of electrocoating continuous lengths of sheet or strip wherein the sheet or strip is cleaned, treated so as to form on the surface thereof a chemical conversion coating, subsequently immersed as an electrode in an aqueous bath containing an electrodepositable polyelectrolyte resin and an electrical current is passed between said surface and an electrode in said bath so as to electrodeposit said resin onto the surface of said sheet or strip, the improvement comprising treating the surface of said sheet or strip having a chemical conversion coating thereon with an aqueous alkaline solution having pH greater than 8, and then surface drying said treated sheet or strip prior to immersing the sheet or strip as an electrode into the resin containing aqueous bath.

7. The method of claim 6 wherein said sheet or strip is a sheet or strip of aluminum or an aluminum alloy.

* * * * *

UNITED STATES PATENT OFFICE
CERTIFICATE OF CORRECTION

PATENT NO. : 3,864,230
DATED : February 4, 1975
INVENTOR(S) : Willard J. Springer and Bruce A. Baker, Jr.

It is certified that error appears in the above-identified patent and that said Letters Patent are hereby corrected as shown below:

Column 6, Line 55, "product" should be --surface--

Column 7, Line 3, "is a" should be --is at a--

Column 7, Line 10, "subsequently" should be --the sheet or strip--

Signed and sealed this 20th day of May 1975.

(SEAL)
Attest:

RUTH C. MASON
Attesting Officer

C. MARSHALL DANN
Commissioner of Patents
and Trademarks